United States Patent Office 2,786,045
Patented Mar. 19, 1957

2,786,045

HYDROXYACYL-AMINO ACIDS AND THEIR POLYMERS

Joseph S. Chirtel, Tallahassee, Fla., and Arthur M. Mark and Sam Brelant, Chicago, Ill., assignors to Tee-Pak, Inc., a corporation of Illinois No Drawing. Application January 21, 1953,
Serial No. 332,546

9 Claims. (Cl. 260—78)

This invention relates to novel compounds which can be designated as hydroxy acids containing an inner amide linkage. More particularly, our invention relates to a new group of compounds and to linear condensation polymers produced therefrom, said compounds having the general formula:

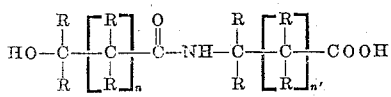

wherein R is a member of the group consisting of H, alkyl, aryl, aralkyl, and alkaryl; and $n+n'$ is at least 1.

This case is a continuation-in-part of our copending application, Serial No. 240,282, filed August 3, 1951, now abandoned.

Mixed ester-amide polymers which are well known in the science of resins and plastics have in the past been prepared by one of the following methods:
1. A dibasic acid heated with a diamine and a glycol.
2. A dibasic acid condensed with an amine alcohol.
3. A polyester heated with a diamine.
4. A polyester heated for a long interval with a polyamide.

We have discovered that an ester-amide type polymer can be produced from an intermediate designated as a hydroxy acid containing an inner amide bond as exemplified in the general formula shown above. Condensations of this type of monomer also produce polymers having a regularity of structure not achieved by the aforementioned earlier known methods.

Our observations have led us to the conclusion that the marked difference in physical properties exhibited by polyesters and by polyamides can be attributed to the nature of the chemical bond which links the non-polar portion of the recurring unit of which the polymer is constructed. This is best illustrated by comparing a pair of polymers whose structures are similar except for the binding polar groups, in one instance the ester linkage (—COO—), and in the other, the amide (—CONH—) linkage. Whereas polyesters are generally low melting and show appreciable solubility in organic solvents, polyamides are often infusible and exhibit poor solubility characteristics. The latter behavior has been particularly characteristic of polypeptides and pure amino acid polymers which have been conventional prior art film-forming components.

To gain the benefit of the preferred physical properties of the two classes of polymers we have synthesized mixed polyester-polyamides. By properly joining hydroxy- and amino-acids with alternate ester and amide linkages we have formed intermediates whose polymers possess thermal and solubility characteristics required for ordinary methods of condensation polymerization and film casting. In other words, our polymers derived, for example, from hydroxyacyl derivatives of beta-alanine or from amino acyl derivatives of hydroxy acids and consequently having alternate ester and amide linkages exhibit melt and solubility characteristics intermediate between those polymers of either pure polyamides or pure polyesters and are superior to either for the preparation of tough, elastic fibers and films such as are used in the food packaging industry.

On further consideration of the general formula given above, it will be noted that with $n+n'$ having a minimum value of 1 the unit length or straight-chain linkage of the intermediate is always greater than 6. In this way intramolecular condensation resulting in ring formation is precluded and linear condensation of the bifunctional monomer is assured. Thus, mixed hydroxy acid-amino acid intermediates composed of both alpha-hydroxy and alpha-amino acids are not within the scope of the invention since these would have only a unit length of 6. Therefore, the lower limit of the inherent unit length for a polymerizable intermediate is represented by beta-alanyl lactic acid and by glycolyl-beta-alanine, the latter having the formula:

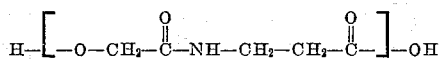

the recurring portion in its polymer being that part enclosed above. In these cases $n=0$ and $n'=1$. Another compound, representing the longer chain intermediates and having a unit length of 13, is 9-hydroxystearyl-glycine having the empirical formula:

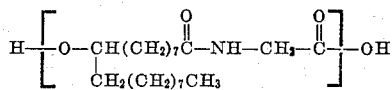

In the matter of chain length these two compounds represent in a general way the scope of our invention. Compounds digressing in chain length from the minimum are achieved by utilizing either longer hydroxy or longer amino acids, or both. By retaining the alpha-hydroxy acid, for example, the overall unit length is extended by employing a longer chain amino acid. Conversely, the short amino acid is retainable whenever a longer chain hydroxy acid is incorporated into the monomer.

It is readily apparent that within the stated limits the concepts of the invention are broadly applicable to amino acids and hydroxy acids, the incorporation of side chains as will be shown subsequently in Examples III and V being also made possible by working with aromatic compounds such as phenylalanine, tyrosine, etc. as will be recognized by persons skilled in the art.

Our invention is best described in detail by the following illustrative examples dealing with the synthesis of various monomers or intermediates, it being understood that the invention is not limited to the specific details given in the examples.

EXAMPLE I

LACTYL-BETA-ALANINE

Because it is one of the simplest hydroxyacylamino acids containing a unit length of seven and since it may ultimately be synthesized directly from naturally occurring lactic acid and beta-alanine, lactyl-beta-alanine is the most representative of the type of compounds encompassed by our invention. Its synthesis is indicated by the following steps.

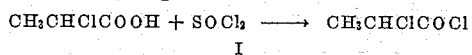

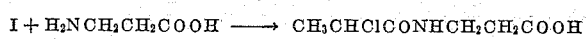

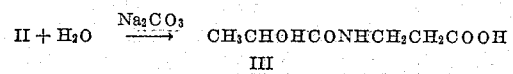

The following describes in detail those three reactions.

A. *Preparation of alpha-chloropropionyl chloride.*—One mole (108.5 gm.) of alpha-chloropropionic acid was added dropwise during a one and one-half hour period to 1.2 moles (131 gm.) of refluxing thionyl chloride. After the addition was complete reflux was continued for an additional hour. The reflux condenser was then replaced by a "Claissen" head and the solution was distilled under diminished pressure (water aspirator). The entire distillate was collected in the range of 45–65° C., the main fraction distilling at 55° C. The distillate was then fractionally distilled through a short, helix-packed column. The fraction boiling at 107–109° C. was collected, which amounted to 94 gm. The yield was 74 percent of theory.

B. *Preparation of alpha-chloropropionyl-beta-alanine.*—One hundred and five grams (1.2 moles) of recrystallized beta-alanine was dissolved in 200 ml. of 6 N sodium hydroxide solution. To this was added with stirring 148 gm. of alpha-chloropropionyl chloride (1.17 moles) in small portions. The reaction mixture was kept alkaline by the addition of another equivalent of 6 N sodium hydroxide in small portions alternately with the acyl halide. The temperature was maintained at −5° to 0° C. (Dry Ice-methanol bath) during the one-hour period required for the addition of the acyl halide. After the addition was complete the cooling bath was removed and stirring was continued for another half hour. The solution was then filtered and the filtrate was acidified with concentrated hydrochloric acid until the solution gave a blue coloration with Congo red test paper. An amorphous precipitate was formed which set up to a hard, white crystalline mass after chilling for four hours at 2° C. This solid was separated by filtration and then recrystallized from 200 ml. of water. After chilling, filtering and drying there was obtained 148 gm. of white prisms melting at 104–106° C., representing 70.5 percent of the theoretical yield.

C. *Hydrolysis of alpha-chloropropionyl-beta-alanine.*—Alpha-chloropropionyl-beta-alanine, 55 gm. (0.306 mole), was added slowly to a solution of 32.5 gm. of C. P. anhydrous sodium carbonate (0.306 mole) in 250 ml. of water. This solution was then refluxed vigorously for fifteen hours. The solution was then concentrated after cooling by distillation under diminished pressure until the sodium chloride which had accumulated made further distillation difficult. The mixture was carefully acidified with concentrated hydrochloric acid to Congo red test paper and again concentrated almost to dryness by distillation under reduced pressure. The last traces of water were removed by azeotropic distillation. Ethyl acetate was added to the mixture and the two-phase system was distilled at atmospheric pressure. The binary azeotrope of ethyl acetate and water boiled at 70° C. From time to time it was necessary to add additional ethyl acetate until all of the water was removed as shown by the increase in temperature to 77° C., the boiling point of pure ethyl acetate. When this had been accomplished the hot mixture was filtered, leaving behind a residue of sodium chloride. Anhydrous ether was then added to the cooled filtrate until a persistent oil phase was present and this mixture was then chilled. This oil crystallized slowly to a white powder which was removed by filtration. This powder melted from 62–66° C. A single recrystallization from ethyl acetate plus ether increased the melting point to 82° C. A second recrystallization gave sharp melting rods from 83–84° C. In all there was obtained 24.1 gm. of product which is 49 percent of the theoretical yield.

*Anal.*—Calc. for lactyl-beta-alanine: C, 44.6; H, 6.84; N, 8.70. Found: C, 44.57; H, 7.23; N, 8.74.

EXAMPLE II

GLYCOLYL-BETA-ALANINE

Glycolyl-beta-alanine exhibits melt and solubility characteristics radically different from its amino acid dipeptide counterpart. For example, glycolyl-beta-alanine gives a clear melt without decomposition in the neighborhood of 100° C., more than 100 degrees lower than glycyl-beta-alanine. Solubility in organic media is much greater for the hydroxy acid-amino acid compound than for the dipeptide.

Glycolyl-beta-alanine may be prepared in accordance with the following procedure which is given by way of illustration, but not limiting example.

A. *Preparation of chloroacetyl-beta-alanine*

$ClCH_2CONHCH_2CH_2COOH$

A two liter, three-necked flask was fitted with an adapter to accommodate a stirrer, two dropping funnels and a thermometer. The flask contained a solution of 89 gm. of beta-alanine (1.0 mole) in 202 ml. of 5 N sodium hydroxide solution. One dropping funnel contained 124 gm. (1.10 moles) of chloroacetyl chloride diluted to 500 ml. with ether, the other held 312 ml. of 5 N sodium hydroxide solution.

The flask was cooled by a salt-ice bath. Stirring was started and when the solution had cooled to 0° C. the chloroacetyl chloride and the sodium hydroxide solutions were added dropwise in small alternate portions of 5 to 10 ml. The addition of the chloroacetyl chloride caused an immediate rise in temperature and addition was discontinued when the temperature reached 6°–7° C. The temperature usually continued to rise to approximately 10° C. and then receded. When the solution had cooled to 2° or 3° C. the sodium hydroxide was added and after additional cooling, if necessary, the cycle was repeated. The addition of these solutions was completed in approximately two hours and stirring was continued for an additional hour while the flask and its contents were allowed to warm to room temperature.

The ether layer was then removed in a separatory funnel and the aqueous system was made acid to Congo red test paper by the careful addition of concentrated hydrochloric acid. The acidified solution was then evaporated to dryness by stirring in vacuo (2 mm.) with the application of mild heat. No heating was employed in the last stages of this concentration.

The resulting solid was then slurried with three 150 ml. portions of hot acetone and the residual sodium chloride which was isolated by filtration amounted to 94.3 gm. (theoretical is 99.0 gm.).

The acetone solution was then diminished by means of an ebullator and a water aspirator until crystallization had begun. The crystals were removed by filtration and an equal volume of chloroform was added to the filtrate. The solution immediately became turbid and after chilling (2° C.) for several hours yielded a large crop of white rods which were floated off an organic oil. The addition of a layer of ether to this oil did not induce any further crystallization.

A total of 108 gm. of dried product was obtained. M. P. 92°–95° C., yield 65%. This was recrystallized by solution in hot methyl isobutyl ketone, filtering, addition of a small amount of petroleum ether and then chilling, to give an 85% recovery. The product then melted at 96° C.

*Analysis.*—Found $N_t=8.48\%$. Calc. for chloroacetyl-beta-alanine, $N_t=8.46\%$.

B. *Hydrolysis of choroacetyl-beta-alanine.*—Chloroacetyl-beta-alanine, 87.3 gm. (0.527 mole) and 55.8 gm. of C. P. sodium carbonate (0.527 mole) were placed in a liter flask fitted with a reflux condenser. Five hundred ml. of water was added and after the evolution of carbon dioxide had ceased the solution was refluxed for six hours. The solution was then concentrated by distillation in vacuo almost to dryness. Concentrated hydrochloric acid was then added slowly with stirring and cooling until the solution was acid to Congo red paper. The solution was again concentrated, this time to dryness by means of evaporation under an air jet.

The residue which consisted of product and salt was then extracted with warm isopropyl alcohol. The alcohol was removed by vacuum distillation leaving a crystalline residue. This was recrystallized from acetonitrile giving 53.24 gm. of fine white crystals melting at 108°–109° C. A sample submitted for analysis gave $N_t=9.30\%$. The theoretical nitrogen for glycolyl-beta-alanine is 9.52%.

Glycolyl-beta-alanine is soluble in water, the lower alcohols and acetonitrile; sparingly soluble in ethyl acetate and acetone; difficultly soluble in ethyl ether.

A sample of glycolyl-beta-alanine recrystallized from ethyl acetate and dried in vacuo was analyzed as follows:

| | Found | Calculated for: $C_5H_9O_4N$ |
|---|---|---|
| C | 40.43, 40.71 | 40.8 |
| H | 6.08, 6.26 | 6.12 |
| N | 9.60, 9.48 | 9.52 |

C. *Preparation of the para-nitrobenzyl ester of glycolyl-beta-alanine.*—Equimolar quantities (0.02 mole) of glycolyl-beta-alanine, para-nitrobenzylbromide and potassium hydroxide were placed in a 125 ml. Erlenmeyer flask fitted with a reflux condenser. Thirty ml. of isopropyl alcohol was added plus just enough water to bring the potassium hydroxide into solution. The final solution tested acid to litmus paper. The solution was then refluxed for one and one half hours and during this period the precipitation of potassium bromide was noted. This salt was removed by filtration after the solution had cooled and a small amount of petroleum ether was added to the filtrate which became cloudy with the final separation of an oil. This oil crystallized to an amorphous white powder after overnight storage in a refrigerator. The powder melted from 65°–69° C. This solid was recrystallized several times from non-polar solvents, usually oiling out after the addition of petroleum ether. The final recrystallization was from a large volume of benzene which yielded clusters of long white needles on cooling without the addition of petroleum ether. The product now melted very sharply at 75.5° C. and analyzed as follows:

| | Found | Calculated for $C_{12}H_{14}N_2O_6$ |
|---|---|---|
| C | 51.02 | 51.06 |
| H | 4.96 | 4.96 |
| N | 10.16 | 9.94 |

EXAMPLE III

ALPHA-HYDROXYISOCAPROYL-BETA-ALANINE

In addition, a homologue of lactyl-beta-alanine, alpha-hydroxyisocaproyl-beta-alanine, was prepared as indicated by the following synthetic path starting with 1-leucine.

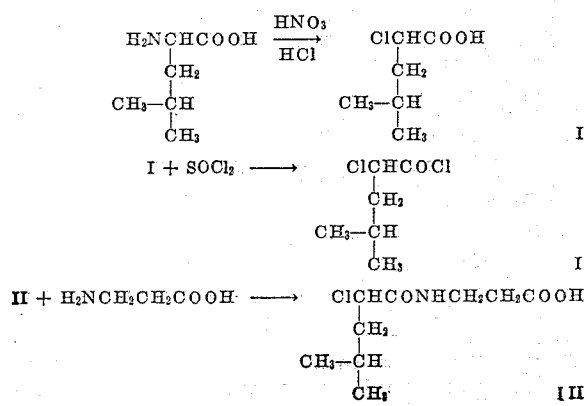

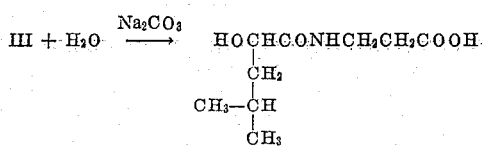

The first two reactions as shown above will be described in detail.

A solution of 200 ml. of concentrated hydrochloric acid (12 N) plus 25 ml. of concentrated nitric acid (16 N) was warmed in a 2-liter beaker to 60° C. on a hot plate. To this was added portionwise 200 gm. of leucine. During the addition the solution frothed and bubbled vigorously. After approximately 100 gm. of leucine had been added it was necessary to add more nitric acid to obtain a homogeneous solution. A total of 125 ml. of nitric acid was used. After this addition was made the reaction rate became very rapid as evidenced by a sudden rise in temperature to 90° C. accompanied by a very turbulent frothing. It was necessary at this point to moderate the rate of reaction by cooling the beaker in an ice bath. After this vigorous phase of the reaction the solution was allowed to stand at 60° C. for 16 hours. Oxidation continued through this period.

A heavy oil layer had formed at this time. Heating was discontinued. The reaction mixture was allowed to cool to room temperature and 500 ml. of water was added. The heavy oil layer was then separated from the aqueous acid phase and the oil was washed with water until the washings were no longer strongly acidic. The oil was dried over anhydrous sodium sulfate and after separation of the desiccant was distilled under reduced pressure. The yield of distillate was 126 gm. (56% of theory) of a colorless, viscous liquid boiling at 88–94° C. at 2 mm. Hg.

This product, alpha-chloroisocaproic acid (126 gm., 0.837 mole) was slowly added to refluxing thionyl chloride (125 gm., 1.05 moles). The flask and its contents were protected from atmospheric moisture by means of a calcium chloride tube affixed to the condenser.

As the addition progressed hydrogen chloride was evolved. After the addition was complete the mixture was refluxed vigorously for an additional two hours to ensure completeness of the reaction. The total reaction time was approximately four hours.

The flask was then allowed to cool and the excess thionyl chloride was removed by means of an ebullator and suction. After a thirty minute interval boiling had ceased and the flask was transferred to a vacuum-jacketed, helix-packed, rectifying column. After rectification, there was obtained 108 gm. of the acid chloride which boiled at 27–30° C. at 1 mm. Hg. The yield was 76 percent of theoretical.

From the alpha-chloroisocaproyl chloride thus formed the third and fourth reactions above proceed in the same manner as that to be subsequently described for the preparation of hydroxyacyl derivatives of epsilon-aminocaproic acid from the chloroacyl chloride. The final product, N-alpha, hydroxyisocaproyl-beta-alanine, obtained by filtration from the acidified hydrolysate is a white solid melting at 72° to 80° C. which, when recrystallized once from methylisobutylketone and twice from water exhibited a melting point of 82° to 84° C. A nitrogen value for this compound was found to be 6.48 percent as compared to the theoretical value of 6.9 percent. It is moderately soluble in water as well as in dilute acids, and readily soluble in alkaline solutions through salt formation.

It is insoluble in the non-polar solvents such as ethyl ether, isopropyl ether, and ligroin. It has a slight solubility in benzene and in chloroform but does not crystallize well from these solutions, tending to form amorphous solids and oils. It is very soluble in alcohols, esters, ketones and may be precipitated from these reactants by the addition of petroleum ether.

EXAMPLE IV

HYDROXYACYL DERIVATIVES OF EPSILON-AMINO CAPROIC ACID

The preparation of representative mixed hydroxy acid-amino acid monomers having unit lengths increased over the minimum value of seven by increasing the chain length of the amino acid portion is presented in the following synthesis of hydroxyacyl derivatives of epsilon-aminocaproic acid.

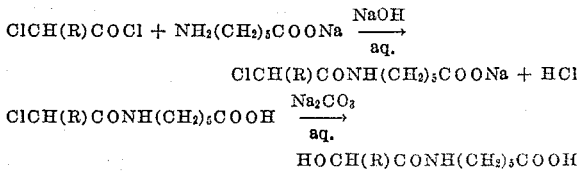

It is obvious of course that gamma-amino butyric or delta-amino valeric acids, for example, could serve as initial reactants in lieu of the epsilon-caprolactam illustrated in the formula above to produce their corresponding hydroxyacyl amino acids. Nevertheless, by employing identical techniques and the same two stage reaction mechanism as was followed in the case of glycolyl- and lactyl-beta-alanine, glycolyl- and lactyl-epsilon aminocaproic acids have been synthesized in excellent yield from the corresponding halogen acid chloride and epsilon-caprolactam as starting materials. Glycolyl-epsilon-aminocaproic acid melted at 74° to 76° C. on the melting block and showed a nitrogen content of 7.05 percent as compared to 7.4 percent theoretical. Lactyl-epsilon-aminocaproic acid, prepared from the interaction of alpha-chloropropionyl chloride and epsilon-caprolactam melted at 108° to 110° C. on the melting block.

*Anal.*—Calc.: C, 53.2; H, 8.38; N, 6.89. Found: C, 52.11; H, 8.61; N, 6.63.

Of the two, lactyl-epsilon-aminocaproic acid is less soluble in water, but both are considerably less soluble than their beta-alanine counterparts.

EXAMPLE V

HYDROXYSTEARYL AMINO ACIDS

In contrast to the reactions just described in which the unit length of the monomer is increased by increasing the chain length of the amino acid portion, monomer production in which the chain length of the hydroxy acid portion is increased is presented as follows in the generalized synthesis of hydroxystearyl amino acids.

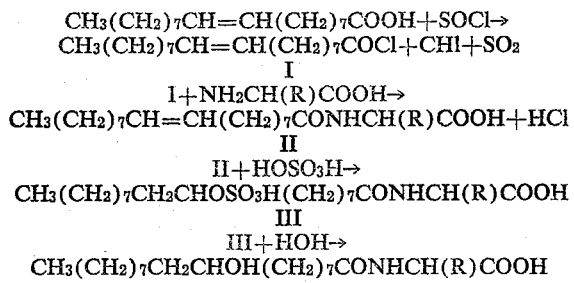

Although these equations show the sulfate, and the hydroxyl group which replaces it, adding to the number 9 fatty acid carbon, it is also possible for them to add to the number 10 carbon. The products, as a mixture of 9 and 10 hydroxystearyl amino acids, are reactive insofar as polymerization is concerned.

Because the functional groups of any 9 or 10 hydroxystearyl amino acids are sufficiently far apart to ensure the desired linear polymerization, the constituent amino acid may include alpha-amino acids such as glycine and leucine. And of course, the amino acid constituent may also be the longer chain structures as was explained earlier.

A specific synthesis of hydroxystearyl glycine is here included, the first process being that of synthesizing oleylglycine as an initial reactant.

EXAMPLE VI

HYDROXYSTEARYL GLYCINE

A. *Preparation of oleylglycine.*—A 65.5 gm. quantity of thionyl chloride was placed in a 500 ml., 3-neck, ground glass, round bottom flask provided with a dropping funnel and a condenser which in turn was equipped with a calcium chloride tube. The flask was placed in a mantle heater set so as to allow the chloride to reflux gently. A 142 gm. quantity of white low-titer oleic acid was added dropwise over a period of 1.25 hours. At the end of this period, the excess thionyl chloride was removed by evaporation under diminished pressure. The residual amber transparent oleyl chloride was sufficiently pure for the next step of the synthesis.

A 37.5 gm. quantity of glycine (0.5 mole) was placed in a 2-liter beaker and dissolved in 1200 ml. of water. A 100 ml. volume of 5 N sodium hydroxide solution was added and the beaker was immersed in an ice bath. Totals of 140 ml. of 5 N sodium hydroxide solution and all of the oleyl chloride were added in small portions with mechanical agitation, the provision being made that the mixture remain alkaline throughout the reaction. The temperature of the reaction mixture was maintained between 15 and 20° C. without difficulty. The tan, opaque, reaction mixture became quite viscous toward the end of the additions.

To ensure adequate mixing of the reactants, the ice bath was removed and the mixture was stirred for one hour while being allowed to warm to room temperature. Addition of 70 ml. of 12 N hydrochloric acid under agitation yielded a light tan, doughy mass of crude oleylglycine. This was collected on a funnel, was washed with one liter of water and was crystallized from 500 ml. of methanol at 4° C., the methanolic solution having been decolorized partially with 2 to 3 gm. of activated carbon. A yield of 78 gm. of slightly tan product was obtained, or 46.0 percent of the theoretical.

A 10 gm. portion of the above product was recrystallized thrice from 100 ml. quantities to give 5.0 gm. of product having a constant melting point of 86–87° C. Nitrogen was found to be 4.20 percent as compared with a calculated value of 4.13 percent. The iodine number by the Hanus method was found to be 71.0 as against 74.7 for the calculated value.

Oleylglycine is soluble in alcohols, acetone, hot ligroin (70–90° C.), benzene and chloroform. The compound is relatively insoluble in water, ethyl ether, ethyl acetate, cold ligroin and petroleum ether.

B. *Sulfation of oleylglycine.*—To effect sulfation as indicated in the third reaction above, a 50 gm. quantity of oleylglycine (0.15 mole) prepared according to the method described above was dissolved in 75 ml. of hot Skellysolve H. The solution was cooled to 10° C. in an ice bath whereupon most of the compound was precipitated in finely divided crystals. A total of 46 gm. (25 ml.) of 95 percent sulfuric acid (0.45 mole) was added portionwise with thorough mixing. The temperature tended to rise but was maintained at 5°—10° C. by the addition of small amounts of powdered dry ice. The mixture was allowed to remain at 5° C. for four hours for completion of the reaction.

C. *Hydrolysis of sulfated oleylglycine.*—A 500 ml. quantity of water was added to the amber colored sulfate and the mixture was warmed to 80° C. The oil which formed was separated and the aqueous fraction containing excess sulfuric acid which would tend to hydrolyze the amide linkage was discarded. In order to remove unchanged oleylglycine the oil was washed with 200 ml. of hot Skellysolve H. Hydrolysis was carried out in 500 ml. of water at 85–95° C. At first the mixture was completely homogeneous but as hydrolysis proceeded the product separated as an oil. Foaming, which was quite pronounced at first, subsided completely within one-half hour. The oil was separated and washed with 300 ml. of boiling water to remove any unhydrolyzed sulfate. Addition of about 0.5 gm. of sodium chloride at this point aided in the separation of the oil and aqueous phases. The oil layer was collected and dissolved in 300 ml. of acetone. Refrigeration at −22° C. yielded 39 gm. of slightly moist product. This was recrystallized at −22° C. from 300 ml. of acetone to give 17 gm. of white product having an iodine number of 7.6 by the Hanus method. The yield of product at this point was 32.3 percent of the theoretical amount.

A composite of 33 gm. of crude hydroxystearylglycine, derived as described and having an iodine number of about 3.5, was dissolved in 300 ml. of warm acetone and decolorized with 1 gm. of activated charcoal. A 300 ml. volume of Skellysolve H was added to the solution and the mixture was allowed to stand at room temperature. Successive recrystallizations were from the same volume of solvents but it was no longer necessary to decolorize the solutions.

The final product obtained, that derived from repeated crystallization from acetone-Skellysolve H, had an iodine number of 1.1. This corresponded to a purity of 98 to 99 percent. A nitrogen value of 3.85 percent for this product was in close agreement with the calculated value of 3.92 as was the molecular weight determination of 355 compared with the calculated value of 357. The melting point tended to rise after each recrystallization until it finally reached a constant 110° to 112° C.

The preparation of polymers from the monomers illustrated above is shown in the following examples.

EXAMPLE VI

POLYMERIZATION PROCEDURES

A. A 3.295 gm. quantity of glycolyl-beta-alanine was placed in a 100 ml. round bottom flask which was then flushed with nitrogen and placed in an oil bath. A clear melt was attained above 115° C. after which the temperature was raised to 145–150° C. for a 23 hour period. The color of the melt gradually changed from a straw color to orange-brown during the course of this period. Total weight loss was measured as 0.395 gm. against a theoretical maximum water loss of 0.403 gm. The product on cooling took the form of a clear, orange-brown, hard, brittle resin and on warming from 30 to 40 degrees above its softening point (80–100° C.), exhibited the phenomenon of cold drawing. Relatively strong, transparent, pliable threads were pulled from the molten polymer.

The product was reheated to 155–160° C. under reduced pressure over a period of 22 hours with an apparent viscosity increase. A sample of this material was transferred to the high vacuum still where it was heated to 160° C. for 20 hours between the pressure limits of 0.001 and 0.01 mm. of mercury. At the end of this interval, the composite product analyzed 10.6 percent total nitrogen (10.85 percent for polyglycolyl-beta-alanine) and showed good thread forming tendencies.

B. A small quantity (0.87 gm.) of glycolyl-epsilon-aminocaproic acid was placed in a 100 ml. round bottom flask and was heated under an inert atmosphere. A clear melt was attained above 85° C., after which the temperature was raised to 150° C. where the reaction set in as evidenced by the formation of fine beads of moisture on the exit sidearm of the flask. The temperature was then raised to 160° C. for heating over a 20 hour interval. Atmospheric heating produced a weight loss of 0.16 gm. (0.08 gm. theoretical water loss) but the product was not very viscous at 100° C.

The resin pot was transferred to a high vacuum unit for heating at 175° C. and about 0.005 mm. of mercury pressure over a period of 22 hours. The melt darkened only slightly and then showed a nominal (qualitative) viscosity increase. Further heating at 190–200° C. (same pressure) for 22 hours produced a sharp viscosity increase. Even at temperatures in excess of 100° C. the polymeric product was hard, rubbery and tough, resembling polyethylene and the nylons.

C. A 2.32 gm. quantity of alpha-hydroxyisocaproyl-beta-alanine was heated under an inert atmosphere until a clear melt was attained in the vicinity of 100° C. Gradual heating to 150° C. (after 2 hours) resulted in the first sign of reaction as evidenced by the evolution of water vapor. The bath temperature was then raised to 160° C. for over a four and a half hour interval during which the clear melt darkened only slightly and showed a weight loss of 0.14 gm. (maximum theoretical water loss, 0.206 gm.).

The resin pot was then transferred to a high vacuum unit for 15 hours of heating at 175° C. and a pressure of 0.05 to 0.1 mm. of mercury. This developed a clear, pale orange, resinous product which analyzed 7.54 percent total nitrogen as compared with 7.57 percent for theoretical polyalpha-hydroxyisocaproyl-beta-alanine.

D. Polymerization of lactyl-beta-alanine was effected by heating in an oxygen-free atmosphere at temperatures between about 150° C. to 180° C. The resulting resin was found to have a degree of polymerization of approximately 9, which corresponds to a molecular weight of about 1350.

Generally, we prefer to effect condensation by heating our monomers within the temperature range of about 150° C. to 180° C. If the temperature is much lower the reaction proceeds very slowly, and if much higher degradation occurs.

By the heretofore described techniques we have produced new compounds capable of undergoing condensation to yield thermoplastic, long-chain linear polymers.

We claim:

1. Hydroxyacyl-amino acids having the structural formula:

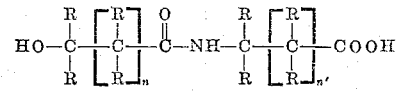

wherein R is a member of the group consisting of hydrogen and alkyl, and wherein at least one of the numbers represented by $n$ and $n'$ is 0 with the sum of $n$ and $n'$ being at least 1.

2. Glycolyl-beta-alanine having the formula:

3. Hydroxystearyl glycine having the formula:

4. Hydroxystearyl leucine having the formula:

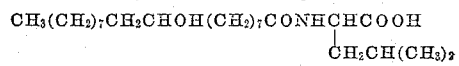

5. Alpha - hydroxyisocaproyl-beta-alanine having the formula:

6. Glycolyl-epsilon-aminocaproic acid having the formula:

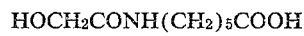

7. A linear condensation polymer having as a recurring group:

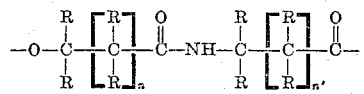

wherein R is a member of the group consisting of hydrogen and alkyl, and wherein at least one of the numbers represented by $n$ and $n'$ is 0 with the sum of $n$ and $n'$ being at least 1.

8. The method of producing glycolyl-beta-alanine which comprises reacting chloroacetyl-beta-alanine with an alkali metal carbonate in the presence of water.

9. A method of producing a hydroxyacyl-amino acid having the structural formula:

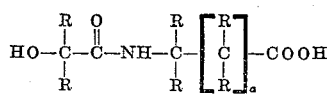

wherein R is a member of the group consisting of hydrogen and alkyl and wherein $a$ is at least 1, said method comprising the haloacylation of an amino acid by condensing an alpha-monochloro substituted alkyl carbonyl chloride with an aliphatic amino acid having the structural formula:

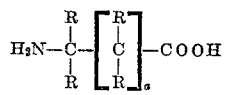

wherein R is a member of the group consisting of hydrogen and alkyl and wherein $a$ is at least 1, followed by alkaline hydroylsis of the resulting compound to replace the alpha chlorine atom with a hydroxyl group.

References Cited in the file of this patent

UNITED STATES PATENTS

| | | |
|---|---|---|
| 2,071,250 | Carothers | Feb. 16, 1937 |
| 2,428,535 | Urist et al. | Oct. 7, 1947 |

FOREIGN PATENTS

| | | |
|---|---|---|
| 587,244 | Great Britain | Apr. 18, 1947 |

OTHER REFERENCES

Marvel et al.: Chem. Abstracts, vol. 15, pp. 527–9 (1921).

Murachi, Chem. Abstracts, vol. 22, p. 255 (1928).

Abderhalden et al.: Chem. Abstr., vol. 26, p. 1579 (1932).

Barnett et al.: Chem. Abstracts, vol. 37, columns 342 and 343 (1943).

Houben, Die Methoden der Org. Chem., vol. 3, pp. 47–49 (1943).

Barnett et al.: Chem. Abstracts, vol. 37, col. 342 (1943).